Feb. 7, 1961　　　　　　　　H. M. FOX　　　　　　　　2,970,898
PROCESS FOR PREPARING SOLID PROPELLANT CHARGES
Filed May 15, 1958
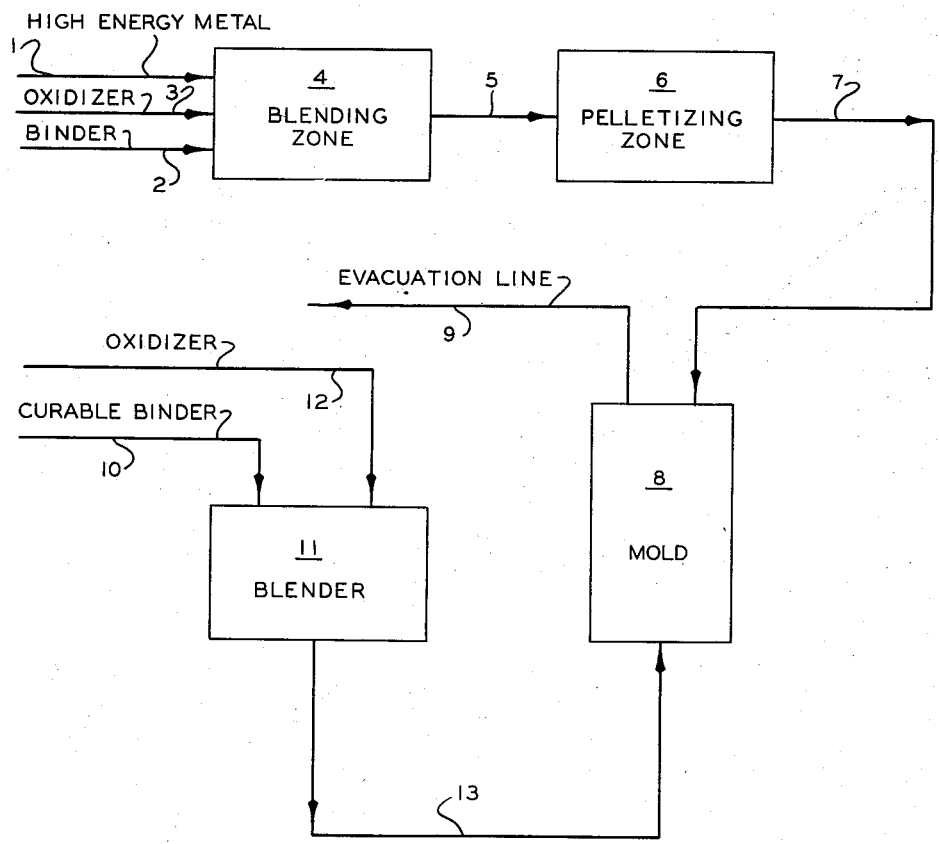
INVENTOR.
H. M. FOX
BY Hudson and Young
ATTORNEYS United States Patent Office 2,970,898
Patented Feb. 7, 1961

2,970,898
PROCESS FOR PREPARING SOLID PROPELLANT CHARGES

Homer M. Fox, Bartlesville, Okla., assignor to Phillips Petroleum Company, a corporation of Delaware Filed May 15, 1958, Ser. No. 735,649

18 Claims. (Cl. 52—.5)

This invention relates to an improved process for preparing solid rocket propellants having high specific impulse. In one aspect this invention relates to an improved method for shaping solid propellant compositions which are not amenable to normal procedures utilized in preparing solid propellant charges. In another aspect this invention relates to a method for casting a propellant charge having an extremely high solids content.

When utilizing solid propellant charges for the operation of rocket motors, numerous methods have been employed for forming the propellant into the desired shape and size. For example, solid propellant charges have been prepared by blending a solid oxidizer and a liquid curable polymer, which also acts as the fuel, and thereafter casting this pourable composition into the desired shape and size, followed by curing to set up the composition as a solid. Solid propellant charges of this nature and a process for their production are disclosed and claimed in copending application Serial No. 284,447, filed April 25, 1952, by W. B. Reynolds and J. E. Pritchard. These propellant charges comprise a solid inorganic oxidizing salt such as ammonium nitrate and a rubbery binder material such as a copolymer of butadiene and a vinyl pyridine or other substituted heterocyclic nitrogen base compound. The composition is cured by incorporating therein a quaternizing agent and curing the shaped or cast propellant charge.

In another mode of operation, blends of a solid inorganic oxidizing salt, burning rate catalyst, and rubbery polymeric binder material have been formulated in mixers, after which this extremely viscous material is extruded into the desired shape and size. These extruded shapes are then cured by a curing process such as by vulcanization to develop their maximum strength. The binder portion of the propellant composition comprises the above-referred to copolymer and compounding ingredients such as a reinforcing agent such as carbon black, a plasticizing material and a curing agent, which can also be the burning rate catalyst such as ammonium dichromate, metal ferrocyanides, and metal ferricyanides. Such propellant compositions and a method for their preparation are disclosed and claimed in copending application Serial No. 574,041, filed March 26, 1956, by E. W. Williams et al.

The above outlined methods of forming propellant charges are usually not applicable for forming cast-in-case propellant charges which contain extremely high loadings of finely divided solids. If, for example, the amount of very finely divided solid oxidizer and finely divided solid fuel exceeds a certain limit in a castable propellant, the viscosity of the resulting mixture is so great as to prevent casting this composition.

It is therefore an object of this invention to provide a process for preparing cast-in-case solid propellant charges of very high finely divided solids content. It is also an object of this invention to provide a process for preparing cast-in-case solid propellant charges having high burning rate and high specific impulse. It is a further object of this invention to provide a process whereby solid propellant charges having extremely high particulate solids content can be cast into the desired size and shape. It is also an object of this invention to provide a novel solid propellant charge having high burning rate characteristics and high specific impulse. Other objects and advantages will be apparent to one skilled in the art upon studying this disclosure and the appended drawing.

The drawing illustrates schematically the steps of the process.

Broadly, the invention contemplates the preparation of solid propellant charges of high specific impulse and burning rate by a process which comprises blending a high energy element and a solid oxidizer, pelleting the resulting blend with or without a small amount of binder material, and utilizing the thus pelleted, high energy element-oxidizer blend in castable propellant compositions employing curable liquid polymers containing solid oxidizing materials whereby the curable liquid polymer acts as the binder for the propellant charge.

In one method employed to utilize the high energy element oxidizer pellets of this invention in the formulation of propellant charges, the high energy element-oxidizer pellets are placed in a mold of the desired size and shape of the finished propellant charge, after which a curable liquid polymeric material which contains dispersed solid oxidizing material is forced into the interstices between the pellets by known methods of vacuum and/or pressure molding. In another method, the pelleted material is admixed with the liquid polymer-solid oxidizer composition, after which the resulting mixture is cast in a mold of the desired size and shape. In either of the methods the cast material is cured, after the molding operation, to develop optimum strength and to otherwise improve the physical characteristics of the binder material. The second method of operation achieves a particularly surprising result since it has been found that these pellets do not cause a great increase in the viscosity of the polymer-oxidizer blend into which they are incorporated. This is surprising since an addition of an equivalent amount of the same material in finely divided form, e.g., 20–100 microns average particle size, to a liquid polymer-solid oxidizer blend will increase the viscosity to a point where the composition is no longer castable.

The pelleted material which is utilized in the process of this invention contains two components, and, in some instances, three. In all cases, a high energy element selected from the group consisting of beryllium, boron, lithium, aluminum, magnesium, silicon and titanium can be utilized. The high energy element will be utilized in the form of a finely divided powder having an average particle size up to about 20 microns. The amount of high energy element in the pellets will be in the range of about 2 to about 20 weight percent based on the total pellet; particularly favorable results are obtained in a range of about 5 to about 10 weight percent. An oxidizer component of the pelleted material will always be present and can be selected from a number of suitable oxidizers, some examples of which are hexanitroethane, ammonium nitrate, ammonium perchlorate, ammonium nitroform, hydroxylamine nitrate, hydrazine nitrate and the like. This oxidizer component will be present in the range of about 80 to about 95 weight percent based on the total pellet composition. The third component, which may or may not be present, depending upon the particular element and oxidizer being employed, acts as a binder material. Some examples of suitable binder materials are polybutadiene, butadiene-2-methyl-5-vinylpyridine copolymers, butadiene-styrene copolymers, an alkyl cellulose containing up to about 6 carbon atoms in the alkyl group, such as ethyl cellulose, tetrafluoroethylene polymers and the like. The butadiene polymers and copolymers listed above can be either of the liquid or the rubbery type. A burning rate catalyst can be incorporated in the rubbery binder composition if desired. The amount of binder composition, if used, will ordinarily not be more than about 5 weight percent based on the total pellet composition.

The oxidizer-high energy element composition is pelleted into discrete particles within the size range of about 1/8 to about 1/4 inch. These dimensions are given as diameters assuming the discrete particles to be spheres, although other shapes of discrete particles can be employed. The maximum packing density will be realized when spheres are employed; thus, this shape of pellets represents a preferred embodiment. These pellets can be formed in any suitable machine for pelleting or tableting, as, for example, a Stokes Pellet Press. The pellets can also be made by extruding the composition into strands and chopping the strands into the proper lengths.

The volumetric percentage of binder will depend on the packing of the spheres. Maximum porosity, which occurs with simple cubic packing, is 47.64 percent; minimum porosity, which occurs with rhombohedral packing, is 25.95 percent (see G. Herdan, Small Particle Statistics, Elsevier, New York, 1953, page 244). In experimental packings obtained by prolonged shaking of spherical particles, the voids are about 39.5 percent (G. Herdan, ibid). Hence, the voids to be filled with binder will probably be, in most cases, slightly greater than 40 percent. Note that all of these percentages are on a volume basis. To convert to a weight basis would require a knowledge of the densities of the materials involved. Also, these figures assume uniform sphere size. If one used the care required to obtain rhombohedral packing and used spheres of a variety of sizes, the porosity could be reduced to 15 percent or less (G. Herdan, ibid). In addition, by dispersing the spheres throughout the binder in such a manner that they are not in contact with each other, the volume percent binder can be increased to above 47.64 percent.

The size, shape, method of packing, and relative density of the pellets, with respect to the curable matrix, will determine the burning rate and specific impulse of the finished propellant. A predetermined value of specific impulse and/or burning rate can be obtained in a cast-in-case propellant by using the size and/or shape of pellets which will provide the proper ratio of pellets to curable matrix.

The liquid material which is utilized as the curable matrix to bond the pellets into a solid propellant charge comprises a curable liquid polymeric material admixed with a solid oxidizer. Some examples of curable liquid polymers which can be used are polysulfide synthetic rubber, polyurethanes, liquid polybutadiene and the like. Some examples of solid oxidizing materials which can be utilized in the curable matrix are ammonium perchlorate, potassium perchlorate, ammonium nitrate and the like. The ratio of the curable liquid polymeric material to the solid oxidizer in the liquid will generally be within the range of about 50:50 to about 20:80 parts by weight.

A preferred embodiment of the invention is illustrated in the flow sheet of the drawing wherein a high energy element such as boron in finely divided form, ethyl cellulose and ammonium perchlorate are fed via conduits 1, 2 and 3 respectively, to blending zone 4. Alternatively, the high energy element can be coated with a portion of the binder in a separate blending zone if the binder is adhesive with respect to the high energy element, the solid oxidizer coated with the remaining portion of the binder composition in another blending zone, followed by blending the coated high energy element and the coated oxidizer in blending zone 4. The blended composition is then removed via conduit 5 to pelleting zone 6. The boron, ethyl cellulose and ammonium perchlorate are fed into blending zone 4 in proportions such that the blended composition being fed to the pelleting zone contains about 8 percent by weight of boron, about 2 percent of ethyl cellulose and about 90 weight percent of ammonium perchlorate. In pelleting zone 6, the composition is pelleted to form discrete particles 3/16 of an inch in diameter. These pellets are then removed from the pelleting zone 6 via conduit 7 and are passed into mold 8 so as to fill substantially the mold. The interstitial spaces between the discrete particles or pellets are freed of air or other gasses through evacuation conduit 9 by means of a vacuum pump (not shown).

The binder composition comprising polyurethane, or the reactants which will react to form polyurethane, is fed via conduit 10 to blender 11. The polyurethane comprises stoichiometric proportions of castor oil and tolylene diisocyanate plus a plasticizer. Ammonium perchlorate oxidizer is fed via conduit 12 to blender 11. Sufficient amounts of these two components are fed to blender 11 to provide a composition which contains about 25 weight percent of the polyurethane and about 75 weight percent of ammonium perchlorate. The resulting homogeneous mixture is then removed from blender 11 via conduit 13 and forced into the interstices between the pellets in mold 8. An extruder or a positive displacement pump can be employed to force the binder composition into the interstices between the pellets in mold 8. The total amount of polyurethane and ammonium perchlorate fed to mold 8 is such that this curable matrix will comprise about 40 weight percent of the final propellant; thus the pelleted material will comprise about 60 weight percent of the final propellant. The vacuum is maintained in mold 8 during the filling of the mold after which pressure is applied, insuring that there will be no void spaces remaining between the pellets in the molded propellant charge in mold 8. Following this step, the propellant charge is removed from mold 8 and cured (not shown). A suitable curing step comprises maintaining the thus-formed propellant charge at a temperature of about 160° F. for about 48 hours. If desired, mold 8 can be the case of a rocket motor; thus the propellant charge is cured in its final location. The finished propellant has a theoretical specific impulse of about 260 seconds.

The curing temperature for the binder composition will generally be in the range between 70 and 250° F. and preferably will be between 170 and 200° F. in order to minimize the time required for the curing operation. The curing time must be long enough to give required creep resistance and other mechanical properties required in the binder composition. The time will generally range from around 3 hours when the higher temperatures are employed to about 7 days when curing is effected at lower temperatures. When the preferred temperature range of about 170 to about 200° F. is employed the curing time will usually be from 24 to 48 hours.

Polyurethane compositions are well known, however, two preferred formulations are shown in the following Table I.

| Ingredients | Parts by Weight | |
| --- | --- | --- |
| | Composition #1 | Composition #2 |
| Castor oil | 57.14 | 56.31 |
| Neopentyl glycol | 10.86 | |
| Toluene diisocyanate | 32.00 | 32.43 |
| Hexylene glycol | | 11.26 |

Commercial diisocyanate is generally employed and it usually is an 80/20 mixture of the 2,4/2,6 isomers.

The ingredients of the polyurethane formulation are mixed together just prior to use.

Conventional equipment is used throughout the process. For example, the blending in the zones 4 and 11 can be done with a "Banbury" internal mixer, the pelleting can be accomplished with the conventional pelleting machine such as a Stokes Pellet Press, and the molding operation can be done in a conventional casting mold having means for applying a vacuum thereto. It is advantageous to have a means for jarring the mold during the time it is being filled with the pellets so as to achieve maximum loading of the pellets. It is preferable to inject the liquid binding material into the lower part of the mold and to apply the vacuum at the top of the mold to avoid channeling.

When the propellant is cast directly into the motor case the motor case usually comprises a cylindrical shell, open at both ends, and preferably coated on the inside with a bonding material. A head, having a port for introduction of binding material, is adapted to be secured to the bottom opening of the motor case. If a longitudinal center opening is to be provided in the propellant charge, a mandrel, coated with a mold release agent, is positioned in the motor case and the pellets are then introduced into the annulus. The top head, having a port for withdrawing gases so as to apply a vacuum on the interior of the case, is attached to the upper end of the case and the mold is then filled with the liquid binding material. The charge is usually cured before removal of the heads used for filling the mold.

EXAMPLE I

A propellant binder composition is made up according to the following recipe:

*Binder recipe*

| Ingredient: | Parts by weight |
| --- | --- |
| 90/10 butadiene/2-methyl-5-vinylpyridine copolymer [1] | 100 |
| Antioxidant [2] | 3 |
| Plasticizer A [3] | 25 |
| Plasticizer B [4] | 25 |
| Paraquinone dioxime | 2 |

[1] Prepared by emulsion polymerization and containing approximately 20 parts per hundred parts rubber of low abrasion furnace black.
[2] Physical mixture containing 65 weight percent of a complex diarylamine-ketone reaction product and 35 weight percent of N,N'-diphenyl-p-phenylenethiamine.
[3] Liquid polymer of butadiene prepared by a sodium-catalyzed polymerization as set forth by Crouch in U.S. 2,631,175 and having a Saybolt Furol viscosity at 100° F. of approximately 2500 seconds.
[4] Light process oil (Circo), light naphthenic-type product composed of special hydrocarbon structures derived from petroleum.

A propellant composition is formulated according to the following recipe:

*Propellant recipe*

| Ingredient: | Parts by weight |
| --- | --- |
| Binder (as described above) | 10.5 |
| Ammonium perchlorate | 84.5 |
| Boron | 5.0 |

This composition is then extruded into cylindrical strands of ¼-inch diameter and these strands are cut into ¼-inch lengths. A rocket motor case in which is centered a star-shaped mandrel is filled with these short cylindrical pieces. The interstices between the cylindrical pieces are then filled with a castable propellant comprising 80 weight percent ammonium perchlorate and 20 weight percent of a liquid material comprising 51 weight percent castor oil, 26.4 weight percent 2-hydroxyethyl ricinoleate and 22.6 weight percent hexamethylene diisocyanate. The thus-formed propellant grain is cured in the case at 160° F. for 48 hours. The propellant grain when fired, has a specific impulse (Isp) of 247 seconds.

EXAMPLE II

Pellets are formed from the following propellant composition:

*Propellant composition*

| Ingredient: | Parts by weight |
| --- | --- |
| Binder: | |
| Polyisobutylene | 2 |
| Binder of Example I | 3 |
| Ammonium perchlorate | 77.5 |
| Decaborane | 17.5 |
| Total | 100 |

The pellets, ⅛-inch spheres, are formed by blending these components together and then pelleting in a pellet press. The pellets are then charged to a motor case and the interstices between the pellets are filled with the castable propellant of Example I. The specific impulse (Isp) of the finished propellant is 263.

Reasonable variations and modifications are possible within the scope of the disclosure without departing from the spirit and scope of the invention.

I claim:

1. A method for preparing a solid propellant composition which comprises forming pellets of about 2 to about 20 weight percent of a high energy element selected from the group consisting of beryllium, boron, decaborane, lithium, aluminum, magnesium, silicon and titanium, 0 to about 5 weight percent of a binder material, and about 80 to about 95 weight percent of a solid oxidizer; substantially filling a mold with said pellets; filling the interstices between the pellets with a curable liquid polymeric material containing a dispersion of particles of from about 20 to about 50 weight percent of a solid inorganic oxidizing salt; and subjecting the resulting composition in said mold to a curing temperature for a time sufficient to cure said curable liquid polymeric material.

2. A method for preparing a solid propellant composition which comprises forming pellets of about 2 to 20 weight percent of a high energy element selected from the group consisting of beryllium, boron, decaborane, lithium, aluminum, magnesium, silicon and titanium, 0 to about 5 weight percent of pellet binder material selected from the group consisting of polybutadiene, butadiene-vinyl-pyridine copolymer, butadiene-styrene copolymer, tetrafluoroethylene polymer and an alkyl substituted cellulose, and about 80 to 95 weight percent of a solid oxidizing compound selected from the group consisting of hexanitroethane, ammonium perchlorate, ammonium nitroform, hydroxylamine, and hydrazine nitrate; substantially filling a mold with said pellets; evacuating gases from said mold; filling the interstices between the pellets with a curable liquid polymeric material selected from the group consisting of a copolymer of butadiene and a substituted heterocyclic nitrogen base, polysulfide synthetic rubber, polyurethane, and polybutadiene, said liquid containing from about 20 to about 50 weight percent of a solid inorganic oxidizing salt; and subjecting the resulting composition in said mold to a temperature in the range of about 70 to about 250° F. for a period of about 3 hours to about 7 days.

3. The method of claim 2 wherein the high energy element is boron.

4. The method of claim 2 wherein the high energy element is lithium.

5. The method of claim 2 wherein the high energy element is aluminum.

6. The method of claim 2 wherein the high energy element is magnesium.

7. The method of claim 2 wherein the high energy element is silicon.

8. The method of claim 2 wherein the pellet binder is an alkyl substituted cellulose.

9. The method of claim 8 wherein the alkyl substituted cellulose is ethyl cellulose.

10. The method of claim 2 wherein the pellet binder is polybutadiene.

11. The method of claim 2 wherein the solid oxidizing compound of the pellet is ammonium perchlorate.

12. The method of claim 2 wherein the solid oxidizing compound of the pellet is hexanitroethane.

13. The method of claim 2 wherein the curable liquid is polyurethane.

14. The method of claim 2 wherein the curable liquid is polybutadiene.

15. A high impulse, high burning rate solid propellant composition comprising about 40 to about 80 weight percent of a plurality of closely packed pellets of a mixture of about 2 to about 20 weight percent of a high energy element selected from the group consisting of boron, decaborane, beryllium, lithium, aluminum, magnesium, silicon and titanium, 0 to about 5 weight percent of a binder material, and about 80 to about 95 weight percent of a solid oxidizer selected from the group consisting of hexanitroethane, ammonium perchlorate, ammonium nitroform, hydroxylamine, and hydrazine nitrate, said pellets being bonded together by about 20 to about 60 weight percent of a binder selected from the group consisting of a copolymer of butadiene and a substituted heterocyclic nitrogen base, polysulfide synthetic rubber, polyurethane and polybutadiene, said binder containing about 20 to about 50 weight percent of a solid inorganic oxidizing salt dispersed therein.

16. A high impulse, high burning rate solid propellant composition consisting essentially of about 40 to about 80 weight percent of a plurality of closely packed pellets containing about 2 to about 20 weight percent of a high energy element selected from the group consisting of boron, decaborane, beryllium, lithium, aluminum, magnesium, silicon and titanium, 0 to about 5 weight percent of a pellet binder selected from the group consisting of polybutadiene butadiene-vinylpyridine copolymer, butadine-styrene copolymer, tetrafluoroethylene polymer and an alkyl substituted cellulose, and about 80 to about 95 weight percent of a solid oxidizer selected from the group consisting of hexanitromethane, ammonium perchlorate, ammonium nitroform, hydroxylamine, and hydrazine nitrate; and about 20 to about 60 weight percent of a binder selected from the group consisting of a copolymer of butadiene and a substituted heterocyclic nitrogen base, polysulfide synthetic rubber, polybutadiene, and polyurethane, said binder containing about 20 to about 50 weight percent of a solid inorganic oxidizing salt.

17. A method for preparing a solid propellant composition which comprises forming pellets of a high energy element selected from the group consisting of beryllium, boron, decaborane, lithium, aluminum, magnesium, silicon, and titanium, 0 to about 5 weight percent of a binder material, and about 80 to about 95 weight percent of a solid oxidizer, based on the total pellet composition; admixing with said pellets in an amount sufficient to fill the interstices between the pellets with a thermosetting liquid polymeric material containing a dispersion of particles of a solid inorganic oxidizing salt; substantially filling a mold with said pellet and liquid polymer mixture; and subjecting the resulting composition in said mold to curing temperature for a time sufficient to cure said thermosetting liquid polymeric material.

18. A high impulse, high burning rate, cast-in-case solid propellant composition comprising a case substantially filled with closely packed pellets containing about 2 to about 20 weight percent of a high energy element selected from the group consisting of beryllium, boron, decaborane, lithium, aluminum, magnesium, silicon, and titanium, 0 to about 5 weight percent of a pellet binder material, and about 80 to about 95 weight percent of a solid oxidizer; and a polymeric binder material containing about 20 to about 50 weight percent of a solid inorganic oxidizing salt substantially filling the interstices between said pellets.

References Cited in the file of this patent

Zaehringer: Chem. Engineering Progress, vol. 51, No. 7, July 1955, page 302.

Chem. and Eng. News, May 27, 1957, pages 18–23 (note page 22).

Chem. and Eng. News, Jan. 6, 1958, pages 79–81.